United States Patent [19]

Teuchert et al.

[11] Patent Number: 4,695,423
[45] Date of Patent: Sep. 22, 1987

[54] METHOD FOR LOADING, OPERATING, AND UNLOADING A BALL-BED NUCLEAR REACTOR

[75] Inventors: Eberhardt Teuchert, Jülich; Klaus-Arne Haas, Düren; Helmut Gerwin, Jülich, all of Fed. Rep. of Germany

[73] Assignee: Kernforschungsanlage Jülich Gesellschaft mit beschränkter Haftung, Jülich, Fed. Rep. of Germany

[21] Appl. No.: 777,353

[22] Filed: Sep. 18, 1985

[51] Int. Cl.$^4$ ............................................. G21C 19/00
[52] U.S. Cl. .................................... 376/265; 376/214; 376/381; 376/458
[58] Field of Search ............... 376/265, 266, 267, 381, 376/382, 214, 356–360, 458

[56] References Cited

U.S. PATENT DOCUMENTS

| | | | |
|---|---|---|---|
| 2,910,416 | 10/1959 | Daniels | 376/265 |
| 3,208,912 | 9/1965 | Jaye et al. | 376/265 |
| 3,251,745 | 5/1966 | Teitel | 376/356 |
| 3,336,203 | 8/1967 | Rausch et al. | 376/265 |
| 3,960,656 | 6/1976 | Lohnert et al. | 376/265 |
| 3,971,444 | 7/1976 | Schweiger et al. | 376/265 |
| 4,312,704 | 1/1982 | Schror et al. | 376/265 |
| 4,372,912 | 2/1983 | von der Decker et al. | 376/381 |
| 4,383,325 | 5/1983 | Noujoks et al. | 376/381 |

FOREIGN PATENT DOCUMENTS

| | | | |
|---|---|---|---|
| 0207059 | 9/1955 | Australia | 376/265 |
| 3042552 | 6/1982 | Fed. Rep. of Germany | 376/381 |
| 1084999 | 9/1967 | United Kingdom | 376/265 |

Primary Examiner—Deborah L. Kyle
Assistant Examiner—Daniel Wasil
Attorney, Agent, or Firm—Frishauf, Holtz, Goodman & Woodward

[57] ABSTRACT

A ball-bed (pebble-bed) nuclear reactor, instead of having fuel elements more or less continuously withdrawn and new or reconstituted fuel elements more or less continuously reintroducted, is initially partly filled with fuel balls of which two-thirds have a fissionable material content 12% below and the upper third 24% higher than the average content. This filling meets the requirements of criticality in order to begin operation. Thereafter, fuel balls are added slowly, a few hundred per day, having 150 to 250% of the average fissionable material content of the initial loading, thus preserving the criticality requirments, while keeping the temperature within safe limits until the reactor cavern is filled. Thereafter, the reactor is shut down, cooled off, pressure relieved and emptied, the last step typically from above. An ordered array of the fuel balls in regular layers avoids excess pressure loads on the reflector over the life time of the filling. For a random packing of the balls a cross-section of the cavern that increases somewhat from the bottom upwards also avoids the excess pressure loads on the reflector.

9 Claims, 12 Drawing Figures

METHOD FOR LOADING, OPERATING, AND UNLOADING A BALL-BED NUCLEAR REACTOR

This invention converns a method for loading a nuclear reactor of the ball-bed type, sometimes known as a pebble-bed reactor, with balls of different fissionable material content.

An important characteristic of the ball-bed reactor consists in the possibility of continuously withdrawing balls out of the reactor, i.e., to sluice them out of the pressure container. New spherical elements are supplied through loading tubes in the cover reflector. Loading and unloading takes place continuously or quasicontinuously under full power operation of the reactor. The time intervals between two loading operations are made so short that no substantial reactivity fluctuations appear which would have to be compensated by supplementary neutron absorbing material. These intervals are in the range between a few seconds and a few days.

In such reactors a favorable power-density distribution and a high efficiency can be obtained. The removal of fuel elements under full power operation, however, requires apparatus involving relatively expensive technology. The pressure container needs to have an additional height of about 1 to 2 meters in order to contain the funnel-shaped downward ball guide, the ball separating device and the pressure lock commonly referred to as a sluice. These devices are difficult of access for repair. The installations for drawing off the unloaded highly radioactive elements involve expensive construction, since the handling must be remotely manipulated and must take place under heavy shielding. The operation and maintenance of the unloading systems and devices, as well as the continual transporting away of the fuel elements, require continuous presence of qualified personnel.

Reactor types other than the ball-bed reactor type are known to have a discontinuous mode of loading at particular intervals, for example several days or weeks every year of shutting down the reactor, cooling it down and relieving it of pressure in order to change the fuel elements. In the operating cycle between two loading operations, supplementary neutron absorbers must be inserted in order to equalize the reactivity change caused by burning down of the fuel. Supplementary control rods, boric acid in the cooling medium or neutron absorbing materials that burn up find application for this purpose. The introduction of these absorber materials load down the neutron economy, resulting in the conversion or breeding rate being reduced, and it brings a certain safety risk into play by the possibility of an erroneous removal from the reactor.

SUMMARY OF THE INVENTION

It is an object of the present invention to provide a reactor loading method and operation in which both the economic disadvantages and the risks of the known batch operation loading are avoided and the use of a complicated system of sluicing out elements from a reactor that is developing power can be avoided.

Briefly, the unloading of the balls is discontinuous and the loading of the reactor with fuel elements takes place with a partial loading of the cavern at the beginning with fuel elements of relatively high fissionable material content for reaching criticality and the contemplated power development; with increasing burning up of the fuel elements, loading is performed continuously or quasi-continuously for compensation of the diminishing fissionable material content in the core. In particular this is done until complete filling of the cavern.

A ball-bed reactor suitable for such loading is distinguished by its design for the initial partial loading followed by subsequently supplemental loading in a manner dependent upon the burning up of the fuel.

In particular it is advantageous to provide between $\frac{1}{4}$ and $\frac{2}{3}$, preferably $\frac{1}{3}$ of the core with the initial partial loading.

It is further preferable that the lower two-thirds of the initial partial loading should have less (e.g. about 12%) fissionable material content and the upper third higher (e.g. about 24%) fissionable material content than is necessary on the average for the critical mass of the initial partial loading.

It has also been found desirable for the fissionable material content of the elements subsequently loaded to be higher by a factor of 1.5 to 2.5, preferably about 1.9, than the average fissionable material content of the elements of the initial partial loading.

It is also advantageous for the core unloading to take place from above.

The long-term residence of fuel balls in the inventive reactor brings about a compacting of the ball bed involving mechanical stresses on the side wall. The same problem arises also under every batch-load operation of any ball-type nuclear reactor.

It is advantageous to have an indented floor for support of the core loading arrangement, preferably with a square grid arrangement of the indentations and a minimum indentation spacing (cross point spacing) which is greater than the fuel element ball diameter particularly by from 1 to 10%, preferably about 5%. The cavern of the reactor can conveniently have a polygonal cross-section of $2^n$ corners where $n=2, 3, 4, \ldots$, having an edge dimension which is an integral multiple of the fuel element ball diameter. An embossing or ribbing of the interior wall of the reactor cavern can advantageously be provided to fit a desired ball stacking arrangement.

Alternatively for a reactor with a random packing of the fuel elements the reactor cavern can desirably have cross-section which increases from the bottom upwards. It may desirably have a frustoconical peripheral surface with an inclination of between 15° and 45° to the vertical, preferably about 25°. The lower third of the peripheral surface just mentioned may advantageously have an angle of inclination of about 45° to the vertical and the upper two-thirds an angle of inclination of about 25° to the vertical.

Alternatively, in vertical section, the cavern inner wall advantageously satisfies the equation $R = R_o - a(Z - Z_o)^2$, where R is the perpendicular spacing of the wall from the central axis of the core cavern, $R_o$ is the spacing of the wall from the central axis at the top surface of the ball bed, Z is the height position, $Z_o$ is the height position at the surface of the ball bed and a is a factor representing the permissible loading of the wall.

It can be advantageous to provide graphite columns or ribs in the core cavern for housing neutron absorbers for shutting down and control.

In this manner of loading the first loading is so measured out that criticality ($K_{eff}=1$) is already obtained under the power conditions contemplated for the reactor as soon as the core cavern is partly filled with fuel elements to some particular extent, for practical purposes, between $\frac{1}{4}$ full and $\frac{2}{3}$ full, and preferably to the level of ⅓ full. During the following period of operation of the reactor, fresh fuel elements are then continuously or quasi-continuously added to the filling. This is done to the extent that is necessary for maintaining the criticality conditions. When the reactor cavern is finally filled up full, the closing down, cooling down and release of pressure of the reactor are carried out and all fuel elements are unloaded in one operation. Such an unloading can take place after about 2 to 5 years of operation. In the case of reactors of low power density, which are intended for heating plants, unloading can take place after 15 to 30 years of operation.

For the complete unloading, a ball removal device at the bottom of the core is useful but is not strictly necessary. Instead thereof the core cavern can also be emptied from above by means of a mechanical conveyor or by suction lifting. The unloading equipment can be installed successively for unloading different reactors which are operated in this fashion. Its manufacturing costs are then correspondingly distributed to the energy costs of several reactors. The same holds for the operation and personnel costs involved in the operation and maintenance of these occasionally installed equipments.

In this manner of reactor loading, the unloading of the fuel elements is found to be substantially simpler than in the case of conventional loading, since the reactor is shut down, cold and without pressure. At the same time, however, the advantage of the ball-bed reactor compared to other reactors is preserved, namely the advantage that no absorber material needs to be inserted in the reactor in order to restrain any excessive reactivity resulting from the burning down cycle.

For economic reasons, it is to be desired that with this new manner of loading the same thermal power can be developed as in the case of operation of the reactor in a conventional manner of loading. Since the initial filling fills up the core cavern only in part, the average power-density in the initial condition must be correspondingly magnified compared to a full core cavern. In order to prevent in this case the exceeding of the permissible power per fuel element (5.7 KW per ball), a spatial distribution of the power-density that is as uniform as possible is sought in the volume of the cavern that is filled with balls. This is obtained by using for the initial loading at least two different fuel element types having respectively different fissionable material content. In the design example described below, the lower two-thirds of the "initial filling" is provided with elements having a fissionable material content lower by 12% than the average value, the upper third with elements with 24% higher fissionable material content relative to the overall average value.

It is also to be desired for reasons of economy that in the unloading of the core the burnt down condition is on the average comparable with the burning down condition obtained (70-100 MWd/Kg$_{HM}$(megawatt days per kilogram of heavy metal)) in the case of reactors loaded in the conventional way. Design calculations show that this can be obtained when the average fissionable material content in the fuel elements subsequently loaded is higher by a factor of 1.9 than the average fissionable material content of the initial partial filling.

In computer simulation of the slow filling up of the reactor with elements of a single value of fissionable material content, it has been found that the necessary filling up rate for fresh elements per day becomes smaller towards the end of the operating period and that, on the other hand, the maximum power loading of the balls is relatively high at the beginning and towards the end. In order to counteract the situation, balls of different fissionable material content could be added also in the loading that follows the initial loading. A predictive computer simulation can work out the most favorable fuel element loadings and fissionable material contents.

One of the results of the reactor loading system of the present invention, with its core remaining undisturbed for a long period of time in contrast to the continuous fuel ball circulation of conventional ball-bed reactors, is a gradually increasing density of fuel balls (i.e. increase of the number of balls per unit volume). Control and shut-down rods are therefore advanced into the surrounding reflector in the case of small reactors and, in the case of larger reactors, which can no longer be controlled by adjustments of the graphite reflector, one or more columns or rib-shaped graphite inserts are preferably provided, into which a neutron absorber can be introduced. The construction of such columns for a reactor designed for the practice of the present invention is substantially simplified compared to such construction in conventional ball-bed reactors, since no continuous movement of the ball bed towards the exit channels takes place and all the force effects connected therewith are eliminated.

Since the balls in the core remain stationary for a relatively long period in the practice of the present invention, it is desirable to charge the reactor slowly and to provide additional procedures and means to produce, so far as possible, an ordered filling of the reactor cavern with fuel balls, in order to obtain a dense packing of the balls, high power-density and uniform distribution of the pressure loading on the balls in the reactor. Such an ordered filling can be stably supported by a core cavern floor having square grid cross-point indentations or dipps. Then by filling the cavern with balls beginning with the lowest layer an ordering of the balls can be produced that is one of the best possible. In order to take account of ball expansions as the result of thermal behavior and burning down over the service life of the fuel element, the indented floor should preferably have a minimum indentation spacing that is slightly greater than the ball diameter, and more particularly a spacing greater by 1 to 10%, preferably about 5% than the mean or nominal diameter of the balls.

The square grid indentation pattern has the advantage over the supposedly optimal hexagonal arrangement of balls on the bottom that when the first layer of balls is covered with more balls, the only positions preferred by the incoming balls are positions actually intended for the next layer, in each case centered over four balls of the underlying layer. In that way the filling of the core automatically and without the necessity of constraint uses the best possible ordering state with maximum spatial density of the balls, which when considered in layers inclined at 45° form a maximum density hexagonal packing with a theoretically obtainable filling factor of 0.74.

In a cylindrical cavern the noticeable mismatches between ball diameter and cavern diameter still allow a certain amount of disorder in the neighborhood of the wall of a cavern to appear tolerable. If desired, however, the cavern cross-section and its internal wall can be constructed to fit the ordered stacking of the balls. Thus the diameter of the peripheral wall can be dimensioned as a corresponding integral multiple of the ball dimension and be equipped with perpendicular ribs so that ordered ball positions can be provided also adjacent to the wall. In order to mitigate an undesired fostering of ball positions in the edge region that are inherently unstable (e.g., arrangement of a ball of the offset layer immediately above the highest point of a ball of the underlying layer), the radii of curvature of the grooves between the ribs are greater than the ball radius, as can be seen in FIG. 4 of the drawings described in detail below. FIG. 4 shows as an example a horizontal (partial) cross-section of an octagonal core that is bounded, as required by this arrangement, by two different types of walls A and B. Type A is preferably equipped with perpendicular ribs of the kind shown, while type B can be either smooth or equipped with perpendicular ribs as illustrated.

The necessary rib structure for rectangular cavern cross-section or in general for polygonal cross-section with an even number of sides and corners is similarly quite simple. In general, a suitable wall structure results from the selected ground plan of the cavern and the ordered ball filling inscribed therein essentially as the enveloping wall for the two mutually offset layers of balls.

Load relief for the side walls, such as can be obtained with an ordered filling of balls with lateral play, can also be obtained for the statistical packing of balls by means of a core cross-section that increases from the bottom upwards, as indicated in FIG. 5. In such a case, a frusto-conical side wall surface with an inclination to the vertical (angle $a$) between 15° and 45°, preferably of about 25°, can be provided (FIG. 5a).

It is still more favorable to make the inclination angle greater in the lower core regions, for example in the lower third, than in the upper region (see FIG. 5b), in which case an angle of about 45° in the lower region and of about 25° in the upper region are particularly preferred.

The optimum configuration is obtained by bowing out the vertical section of the core cavern in such a way that the vertically effective components of the force on the container wall are equally great at all heights. This is obtained by shaping the cavern cross-section with respect to the height level approximately in accordance with the equation $R = R_o - a(Z - Z_o)^2$, as illustrated in FIG. 5c. In this equation R signifies a spacing of the wall from the central axis of the core cavern, $R_o$ the radius at the subsurface of the ball bed, Z the height position or level, $Z_o$ the height position or level at the surface of the ball-bed, while a calculates out as a proportionality factor corresponding to the permissible loading of the wall.

The importance of the subject matter of the foregoing three paragraphs should not be underestimated, even though FIG. 1, in order to simplify the explanation of the method of the invention, does not incorporate the important features discussed above in connection with FIGS. 5a, 5b and 5c.

In the reactors of the present invention, ball-bed cores are operated in the mechanically quiescent state, with the advantage already mentioned above. Not only in the practice of the method of the invention above described, but in any conceivable batch operation of a mechanically quiescent ball-bed or nuclear reactor, the forces resulting from expansion of the fuel balls, as the result of thermal and radiation effects, have a vertical component against which the weight of the bed above the place of expansion acts as an opposing force, and also a horizontal component that results in loading of the lateral walls.

As above described, therefore, the aspect of the invention now discussed provides for limiting the pressure forces impinging on the lateral wall surfaces of the core container, and accomplishes that in two ways, first by the shaping of the cavern as described in connection with FIGS. 5a, 5b and 5c and, second, by the provision of an indented floor with indentations at the crosspoints of a square grid pattern with a minimum crosspoint spacing slightly larger than the ball diameter so as to maintain an ordered arrangement of the balls.

This loading can be reduced by disposing the lateral wall obliquely as shown in FIG. 5a. If the inclination to the vertical (angle $a$) is sufficiently large, the output pressure against the wall results in producing a component of force directed upwards parallel to the wall. As already explained, the configuration of FIG. 5b makes still better use of this principle. Finally, the configuration explained with reference to FIG. 5c shows an optimal configuration in which the vertically operating components of the force on the container wall are the same at all levels of the ball bed.

Finally, it should again be noted that the prevention of excessive forces on the lateral walls of the cavern as the result of expansion of the fuel balls can also be accomplished by filling the fuel balls in such a way that they stack themselves in an ordered array providing a small amount of horizontal play, this being brought about essentially by the indentations in the cavern floor located at the cross-points of a square grid having a minimum spacing between cross-points, such that there is 1 to 8% play between the fuel balls of the bottom layer that come to rest in the indentations, and likewise of the layers thereabove which come to rest in positions centered above four balls of the immediately underlying layer. The arrangement that results has the further advantage of providing a high power-density in the core and uniform distribution of pressure loading on the balls and walls of the core.

The features discussed with reference to FIG. 4 likewise lead to uniform distribution of pressure in response to expansion forces generated in the fuel balls.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
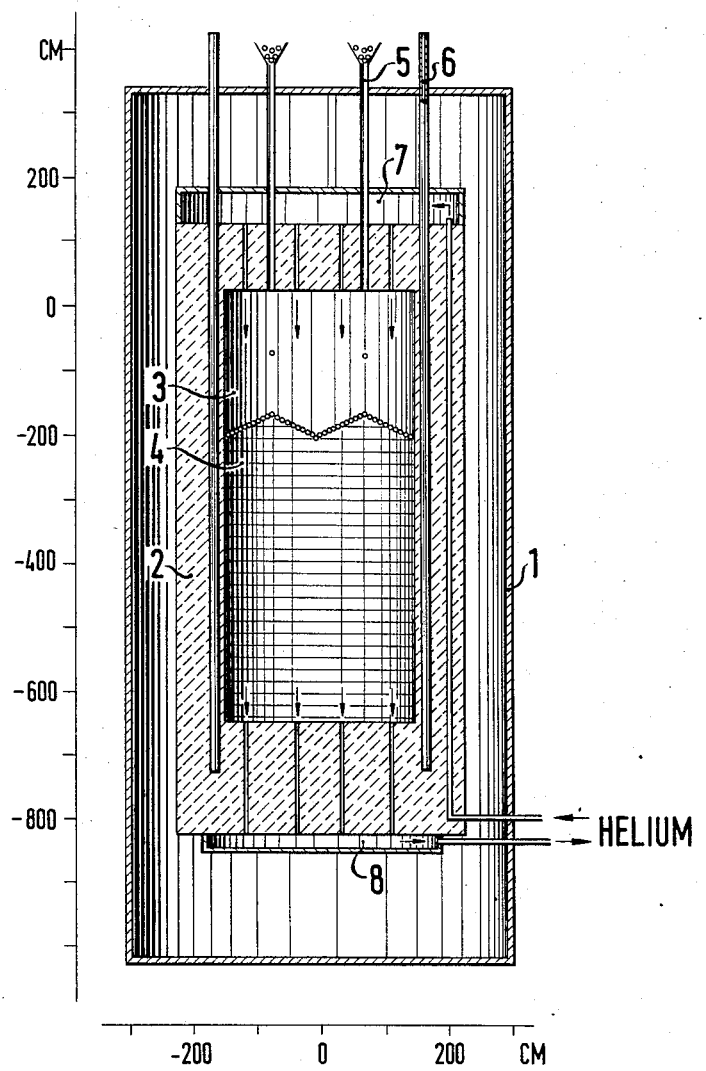
FIG. 1 is a schematic representation of a cylindrical container of a ball-bed nuclear reactor in accordance with the invention.

As shown in FIG. 1, there are located in the pressure vessel 1 a graphite reflector 2 surrounding a cavernous space 3 into which a bed of fuel element balls 4 is filled. The latter are loaded and unloaded by means of loading and unloading tubes 5. Control rods 6 are provided in the reflector. The ball bed is cooled by helium that flows in below, then upward through the reflector side walls to an upper gas gathering chamber 7, thence into the empty part of the cavern 3, down through the ball bed 4 and the reflecting floor to a lower chamber 8 for collecting hot gas, from which it is drawn out by suction. An opposite gas flow direction is also possible.

The core cavern has a volume of 46 m$^3$ and the thermal power produced amounts to 200 megawatts. The helium cooling medium flows downwards and is heated from 250° C. to 700° C. The fuel elements, of a diameter of 6 cm contain $UO_2$ as fuel in the form of "coated particles". In the initial loading ⅓ of the core cavern is filled with fuel elements. The lower 2/9 are loaded with balls with 5% uranium enrichment and above them the remaining 1/9 of the cavern that is initially filled is loaded with balls with 7% uranium enrichment. Under these conditions criticality is reached. During power-producing operation fuel elements with 10.7% enrichment are added little by little. At the beginning the additional loading is at the rate of 350 balls per day and towards the end of the operating period that becomes 210 balls per day. This is determined out of the requirement of continuously maintaining the criticality of the reactor. After 611 days under full load, the reactor is completely filled and must be unloaded. The burning down is, on the average, 74 MWd/Kg$_{HM}$ and at the maximum 105 MWd/Kg$_{HM}$.

Figures 2A, 2B, 2C, 2D, 2E, 2F:
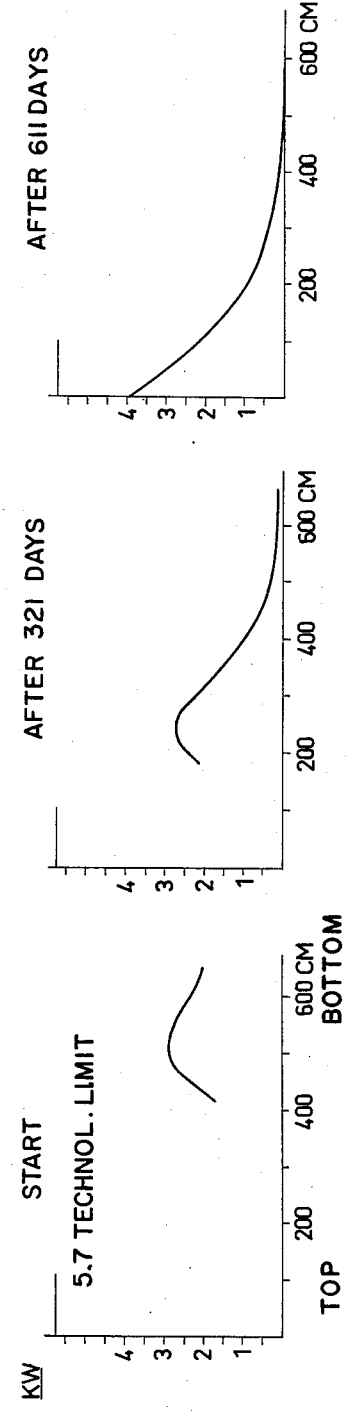
FIGS. 2a, 2b and 2c are graphs showing power-density at various levels respectively at the start, after 321 days and after 611 days.
FIGS. 2d, 2e and 2f are graphs of temperatures at the helium inlet, at the top surface of the ball-bed and at the center of the latter respectively at the start, after 321 days and after 611 days.
Figure 3:
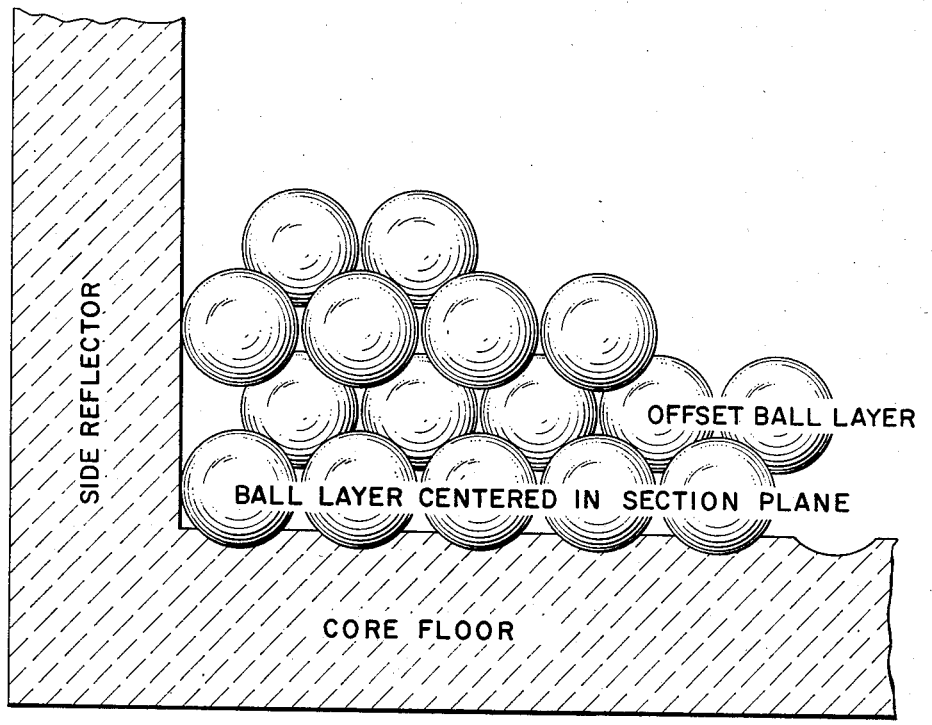
FIG. 3 is a schematic vertical section diagram showing a portion of an indented cavern floor, a portion of a cavern side reflector wall and a part of the ball-bed filling.
Figure 4:
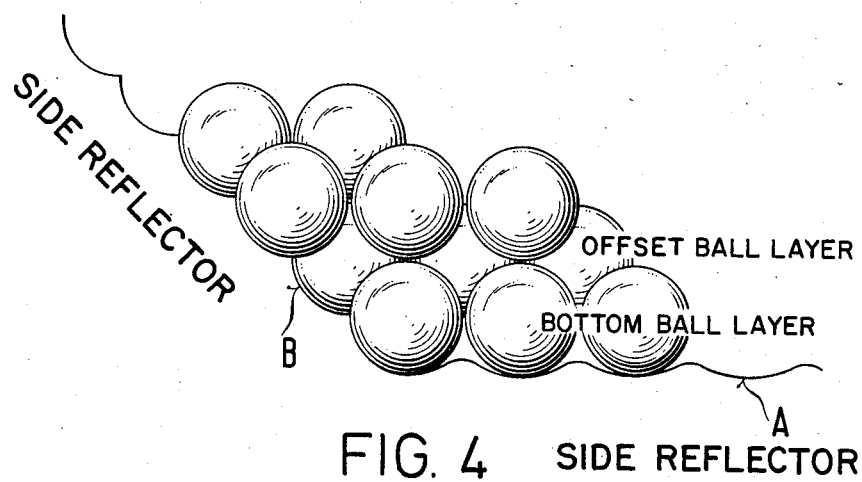
FIG. 4 is a partial top view of an octagonal core in a diagrammatic section through the middle of the offset ball layer resting on top of the lowest ball layer.
Figures 5A, 5B, 5C:
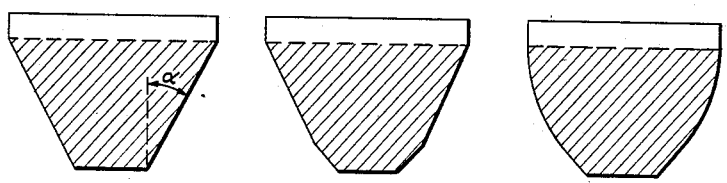
FIGS. 5a, 5b and 5c are schematic cross-sectional views of an initial filling in a reactor having a cross-section that widens from the bottom upwards.

The power distribution in the axial direction is at first relatively uniform and symmetrical. In the course of filling up, the maximum is displaced to the upper region where the freshly added balls are found (see FIG. 2). The maximum fuel temperature varies during the operating period between 735° C. and 910° C., remaining thereby at all times substantially below the maximum permissible temperature of 1250° C.

In a simulation of an accident in which it is assumed that helium escapes from the reactor, the calculation shows a maximum temperature of 2005° C. A change of the reactor design in which a graphite central column with a radius of 85 cm is provided and correspondingly magnified radius of the cavern by 22 cm has the result of diminishing the fuel element maximum temperature in such an accident down to 1430° C. In this reduced maximum temperature, diffusion of the fission products out of the coated particles is avoided.

Although the invention has been described with reference to a particular illustrative example, it will be understood that variations and modifications are possible within the inventive concept.

We claim:

1. Method of operating a ball-bed nuclear reactor with fuel element balls, some of which have a fissionable material content different from that of others of said balls, comprising the steps of:

initially partly filling a reactor cavern, to produce a reactor core therein, with fuel balls of sufficient fissionable material content for establishing criticality and a desired level of power production at the completion of said partial filling and then, without any further filling of said reactor cavern, starting reactor operation;

thereafter without any removal of fuel balls from said reactor cavern, filling fuel balls continually or in groups at relatively short intervals into said reactor cavern during increasing burning up of the fuel balls already therein, for compensation of the diminishing fissionable material content of the reactor core constituted by said fuel balls until a final total quantity of filling is reached;

after said final filling quantity is reached and burning up has occurred, shutting down the reactor, cooling it off, releasing the pressure in said cavern, and thereafter unloading all said fuel balls from said reactor cavern, unloading being begun when the reactor is shut down and being completed before said reactor is restarted.

2. Method according to claim 1, in which the initial loading of said reactor cavern constitutes loading not less than ¼ nor more than ⅔ of the aggregate of fuel balls necessary for the complete filling of the core cavern in the final stage of operation of said reactor preceding final shutdown and unloading.

3. Method according to claim 2, in which said partial loading constitutes approximately ⅓ of said aggregate of fuel balls necessary for the complete core filling.

4. Method according to claim 2, in which the lower ⅔ of said initial partial loading of fuel balls in said reactor cavern consists of fuel balls having less fissionable material content than the average fissionable material content of said partial loading and the upper ⅓ of said partial loading consists of fuel balls having higher fissionable material content than the average fissionable material content of said partial loading.

5. Method according to claim 1, in which the fissionable material content of the fuel balls added after the initial loading and the attainment of criticality necessary for operation therewith have a fissionable material content, which is between 150% and 250% of the averge fissionable material content of the fuel balls of the initial loading of the reactor.

6. Method according to claim 5, in which said subsequently added fuel balls have a fissionable material content which is approximately 190% of the average fissionable material content of the fuel balls of said initial loading of said reactor.

7. Method according to claim 1, in which the unloading of fuel balls of said core from said reactor cavern is performed from above.

8. Method according to claim 1, in which the loading of the fuel balls of said core in said reactor cavern produces an ordered array of said fuel balls in stacked layers.

9. Method according to claim 4, in which the lower ⅔ of said initial partial loading of fuel balls in said reactor cavern consists of fuel balls having about 12% less fissionable material content than the average fissionable material content of said partial loading and the upper ⅓ of said partial loading consists of fuel balls having about 24% higher fissionable material content than the average fissionable material content of said partial loading.

* * * * *